United States Patent
Goodworth et al.

(10) Patent No.: US 6,915,861 B2
(45) Date of Patent: Jul. 12, 2005

(54) BALLISTIC FIRE PROTECTION PACKAGING SYSTEM

(75) Inventors: Allen R. Goodworth, Milford, CT (US); William E. Lindsay, Mesa, AZ (US); Daniel D. Wilke, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 98 days.

(21) Appl. No.: 10/246,949

(22) Filed: Sep. 18, 2002

(65) Prior Publication Data

US 2004/0050723 A1 Mar. 18, 2004

(51) Int. Cl.⁷ .................................................. A62C 3/07
(52) U.S. Cl. ............................ 169/66; 169/46; 169/62; 206/216; 206/461; 206/803
(58) Field of Search ................................ 169/43, 45, 46, 169/66, 26, 56, 57, 62; 53/471; 206/216, 460, 461, 526, 527, 803; 428/920

(56) References Cited

U.S. PATENT DOCUMENTS

| | | | | |
|---|---|---|---|---|
| 3,486,563 A | * | 12/1969 | Cholin et al. | 169/26 |
| 3,710,855 A | * | 1/1973 | Osorio | 169/26 |
| 3,782,475 A | * | 1/1974 | Schmidt | 169/50 |
| 3,813,279 A | * | 5/1974 | Varner, Jr. | 428/178 |
| 3,930,541 A | * | 1/1976 | Bowman et al. | 169/62 |
| 4,100,970 A | * | 7/1978 | Kreske, Jr. | 169/57 |
| 4,121,666 A | * | 10/1978 | Rozniecki | 169/62 |
| 4,132,271 A | * | 1/1979 | Mikaila | 169/62 |
| 4,215,752 A | * | 8/1980 | Waller | 169/58 |
| 4,251,579 A | * | 2/1981 | Lee et al. | 428/73 |
| 4,763,731 A | | 8/1988 | Adams et al. | |
| 5,425,886 A | | 6/1995 | Smith | |
| 5,762,145 A | * | 6/1998 | Bennett | 169/62 |
| 6,082,464 A | | 7/2000 | Mitchell et al. | |
| 6,119,887 A | * | 9/2000 | Palazzo | 220/586 |
| 6,322,873 B1 | * | 11/2001 | Orologio | 428/178 |
| 6,572,948 B1 | * | 6/2003 | Dykhoff | 428/76 |

* cited by examiner

Primary Examiner—Jim Foster
(74) Attorney, Agent, or Firm—Black Lowe & Graham PLLC

(57) ABSTRACT

The present invention presents a system for packaging fire suppressing material. An outer membrane is configured to support and release a fire suppression material when impacted by a ballistic or incendiary round. An inner membrane is configured to support and release the fire suppression material when impacted by a ballistic or incendiary round, and the inner membrane and the outer membrane is connected to form at least one cell holding the fire suppression material. In accordance with other aspects of the invention, the inner and outer membranes suitably form a bubble pack filled with a fire suppression powder. Further, the inner and outer membranes may be combined with a lightweight honeycomb panel to form a lightweight and simple system to support fuel tanks.

8 Claims, 2 Drawing Sheets

BALLISTIC FIRE PROTECTION PACKAGING SYSTEM

GOVERNMENT LICENSE RIGHTS

This invention was made with Government support under U.S. Government contract DAA110-98-2-0002 awarded by The United States Army. The Government has certain rights in this invention.

FIELD OF THE INVENTION

This invention relates generally to fire suppression systems and, more specifically, to fire suppression systems providing protection from ballistic or incendiary rounds.

BACKGROUND OF THE INVENTION

Military aircraft including helicopters and other vehicles and equipment subject to enemy fire commonly have self-sealing fuel tanks. Often these fuel tanks need to be supported after the impact of a ballistic or incendiary round while the fuel tank seals itself. Additionally, fire suppression systems are commonly used to suppress fires in the areas surrounding the fuel tanks. These systems suppress fires feeding on fuel leakage after impact of a ballistic round, during and after the tank self-sealing. In helicopters, the self-sealing fuel tank is often a fuel cell including a flexible outer wall and an inner wall of self-sealing soft material. The self-sealing fuel cell itself is supported within the vehicle by frames and backer boards spanning the frames. In other aircraft, self-sealing tanks are often integral to either the fuselage or aircraft wing.

Current ballistic protection systems for fuel tanks in military aircraft typically use foam or aluminum oxide fire suppression materials to prevent fires or explosion from incendiary rounds. Ballistic nylon backer boards made from plays of nylon impregnated with plastic are sometimes incorporated in fire protection systems to continue to support self-sealing fuel cells after a ballistic impact to assist the self-sealing function of fuel cells.

Fire protection systems used in fuel tank areas include active systems that spray or disperse fire suppression materials. The cost of installation and maintenance of such active systems is typically high. Other fire protection systems are passive systems. Passive honeycomb or sandwich structural panels incorporating fuel suppression powders can form a self-sealing fuel tank wall, or support a fuel cell during self-sealing, but load-bearing honeycomb or sandwich panels do not always rupture sufficiently upon a ballistic impact to disperse adequate fire suppressing powder. Custom-shaped non-load-bearing powder-filled sandwich panels or foam blocks incorporating fire suppression materials have been found to suppress fires from ballistic rounds. However, these panels or blocks must be specially shaped or cut and require additional supports, thereby complicating their installation.

Therefore, an unmet need exists for lightweight and easily installed systems to disperse fire suppression materials subject to ballistic fire, including areas surrounding fuel tanks in aircraft.

SUMMARY OF THE INVENTION

The present invention presents a lightweight passive system for dispersing fire suppression materials subject to ballistic fire. The system is inexpensive and easy to install, and may be used with lightweight fuel tank support panels, reducing structural weight where the system is installed, such as in military aircraft or vehicles.

The present invention presents a system for packaging fire suppressing material. An outer membrane is configured to support and release a fire suppression material when impacted by a ballistic or incendiary round. An inner membrane is configured to support and release the fire suppression material when impacted by a ballistic or incendiary round, and the inner membrane and the outer membrane is connected to form at least one cell holding the fire suppression material.

In accordance with other aspects of the invention, the inner and outer membranes suitably form a bubble pack filled with a fire suppression powder. Further, the inner and outer membranes may be combined with a lightweight honeycomb panel to form a lightweight and simple system to support fuel tanks.

BRIEF DESCRIPTION OF THE DRAWINGS

The preferred and alternative embodiments of the present invention are described in detail below with reference to the following drawings.

DETAILED DESCRIPTION OF THE INVENTION

The present invention presents a system for packaging fire suppressing material. Given by way of overview, in one embodiment of the present invention an outer membrane is configured to support and release a fire suppression material when impacted by a ballistic or incendiary round. An inner membrane is configured to support and release the fire suppression material when impacted by a ballistic or incendiary round, and the inner membrane and the outer membrane is connected to form at least one cell holding the fire suppression material. In accordance with other aspects of the invention, the inner and outer membranes suitably form a bubble pack filled with a fire suppression powder. Further, the inner and outer membranes may be combined with a lightweight honeycomb panel to form a lightweight and simple system to support fuel tanks. An exemplary embodiment of the invention is discussed with more particularity below.

Figure 1:
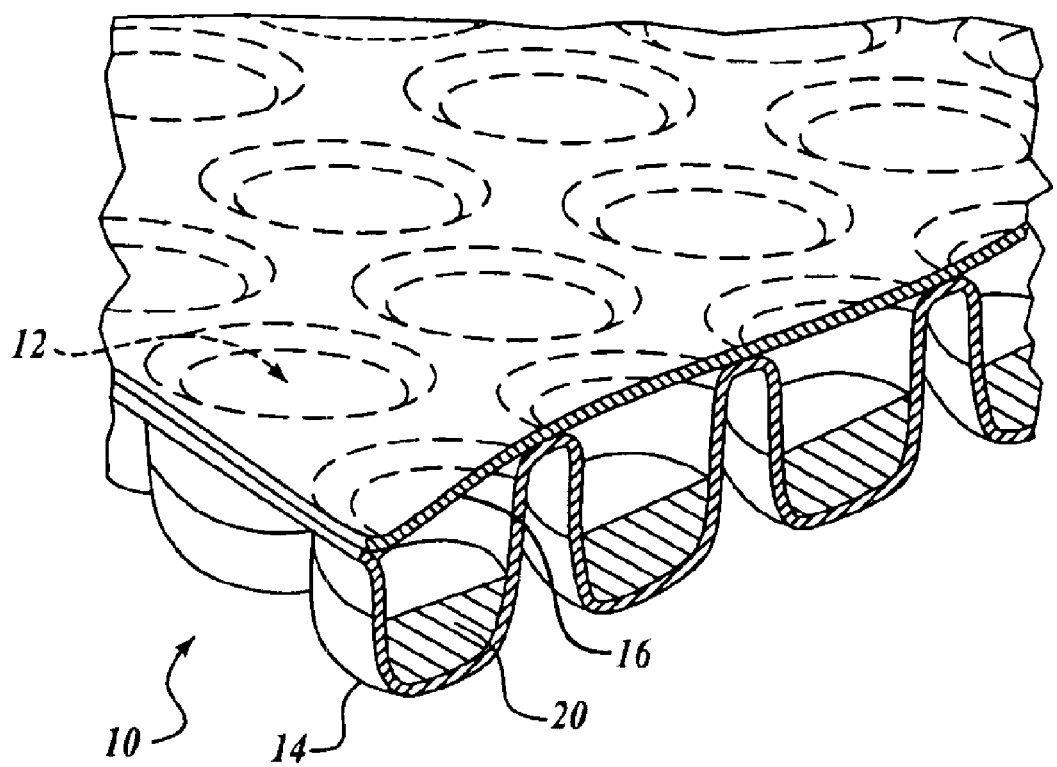
FIG. 1 is a perspective view of an exemplary bubble pack of the present invention.

Referring to FIG. 1, a fire suppression system 10 implementing the present invention. The system 10 is suitably implemented using a bubble pack similar to shipping packaging bubble pack. The system 10 includes an outer membrane 14 and an inner membrane 16 forming cells or bubbles 12 that are filled with fire suppression material 20.

It will be appreciated that the inner membrane 16 and the outer membrane 14 may be fastened together in any suitable fashion, such as heat bonding, and in any suitable pattern, not limited to a bubble pattern, that form a series of cells 12 to be filled with fire suppression material 20. In this embodiment, the inner membrane and the outer membrane include a polyethylene, polypropylene or other plastic film that is easily frangible when impacted by a ballistic or incendiary round, thereby releasing the fire suppression material 20 from a plurality of bubbles 12. It will be appreciated that any relatively low-strength material may be utilized in the present invention such that the force of a ballistic impact ruptures cells or bubbles 12 adjacent to the impact point, as well as those directly impacted by the round. The rupturing of cells or bubbles 12 beyond the impact point of the round releases additional fire suppressing material 20 to suppress any fires that may be started by impact or passage of the round.

Figure 2A:
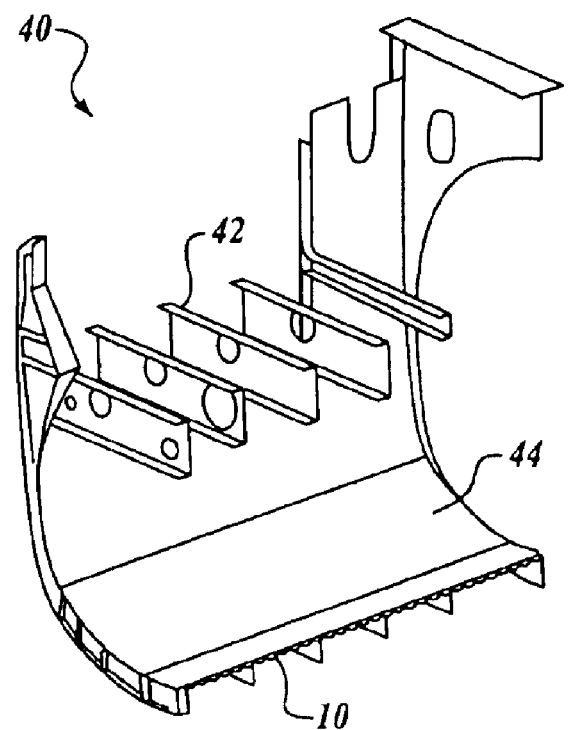
FIG. 2A is a perspective view of a representative aircraft fuel bay with an embodiment of the present invention installed; and, FIG. 2B is a detail of a representative fuel bay panel section with an example of the present invention installed.

FIG. 2A shows an exemplary aircraft fuel cell bay incorporating an embodiment of the present invention. In this example, the system 10 is installed in an aircraft fuselage 40 including fuel bay support frames 42 and fuel bay support panels 44. The support panels 44 span the support frames 42 that support a fuel cell or fuel tank (not shown). An exemplary embodiment of the fire suppression system 10, such as that illustrated in FIG. 1, is suitably attached to the outside of the support panels 44, between the support frames 42.

Figure 2B:
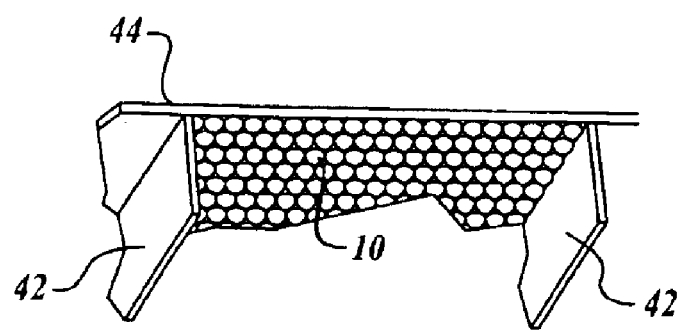

Referring now to FIG. 2B, an exemplary embodiment of the fire suppression system 10 is installed on an outer surface of the support panels 44 between the support frames 42. Referring now to FIGS. 1, 2A, and 2B, the system 10 is suitably attached to the support panels 44 with double-sided tape (not shown). In this example embodiment, the double-sided foam tape is a thin film of foam with double-sided sticky backing strips of tape attaching the bubble pack 10 to the support panel 44. Separated strips of tape are used so that the impact of a ballistic or incendiary round advantageously pulls the bubble pack upon impact, causing a plurality of the bubbles 12 containing fire suppression material 20 to rupture and release the fire suppression material 20. It will be appreciated that the double-sided tape need not be foam, but may suitably be fabric or other suitable material. It will also be appreciated that the fire suppression material 20 suitably may either fully or partially fill the bubbles 12.

It will be appreciated that any suitable pattern of foam tape, or any other acceptable fastening material and fastening pattern, including, without limitation, spaced ties or a spaced grid of adhesive, may be used to tack a packet of fire suppression material 20 or the system 10 to the support panels 44. Such alternative attachments still permit the system 10 to be pulled and ruptured when impacted by an incendiary or ballistic round.

Installation of the system 10 with foam tape between the support frames 42, as shown in FIG. 2B, allows the support panel 44 to be extremely lightweight. As a result, there is no need for special provisions for holding or supporting the fire suppression material 20. In the exemplary embodiment shown in FIGS. 2A and 2B, the support panel 44 suitably is a lightweight composite honeycomb panel that is typically lighter in weight than ballistic nylon backer boards often used as fuel cell support panels. In this embodiment, the composite material suitably is a graphite and nylon honeycomb composite board that resists fracture when hit by a ballistic round. It will be appreciated that the system 10, combined with double-sided foam tape, is easily cut and applied to the support panels 44. This is in contrast to thicker and more cumbersome fuel suppression panels, such as foam blocks, or rigid or semi-rigid fire suppression sandwich boards. Other than the foam tape for attaching the system 10 to the support panels 44, no additional structure, attachment, or framing are required to support the fire suppression material.

In one exemplary embodiment the fire suppression material 20 includes aluminum oxide powder. The aluminum oxide powder is released after an incendiary or ballistic round ruptures the bubble pack, effectively preventing an explosive or flammable mixture of air and fuel in the area around the fuel tank. The fracture-resistant, composite honeycomb support panel 44 effectively supports the fuel cell during self-sealing of entrance and exit holes created by the ballistic round. It will be appreciated that any suitable fire suppression material that may be contained and then released when impacted by a ballistic round may be utilized in the present invention.

In an exemplary embodiment, the present fire suppression system with lightweight honeycomb support panels reduces the weight of helicopter fuel tank systems. However, the present invention is not limited to helicopters or aircraft, or fuel tank areas, but may be utilized wherever fire suppression protection from ballistic or incendiary rounds in equipment or vehicles is desired.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A system for packaging fire suppression material, the system comprising:
   an outer membrane configured to support and release a fire suppression material; and
   an inner membrane configured to support and release the fire suppression material, the inner membrane being connected to the outer membrane forming at least one cell that is arranged to contain the fire suppression material such that the fire suppression material is releasable from the at least one cell upon rupture of the at least one cell;
   a support panel arranged to support a fuel tank, the at least one cell being attached to the support panel with double-sided tape.

2. The system of claim 1, wherein:
   the at least one cell includes a bubble pack.

3. A system for fire suppression for fuel tanks, the system comprising:
   at least one support panel arranged to support a fuel tank;
   at least one cell attached to the at least one support panel with double-sided tape, the at least one cell including:
      an outer membrane configured to support a fire suppression material and configured to release the fire suppression material upon ballistic impact;
      an inner membrane configured to support a fire suppression material and release the fire suppression material upon ballistic impact, the inner membrane being connected to the outer membrane to contain the fire suppression material in the at least one cell; and
   fire suppression material contained within the at least one cell, the fire suppression material being releasable from the at least one cell upon rupture of the at least one cell.

4. The system of claim 3, wherein:
   the at least one cell includes a bubble pack.

5. A system for fire suppression for fuel tanks, the system comprising:
   at least one support panel arranged to support a fuel tank wherein the at least one support panel includes a composite honeycomb panel;
   at least one cell attached to the at least one support panel, the at least one cell including:
      an outer membrane configured to support a fire suppression material and configured to release the fire suppression material upon ballistic impact;

an inner membrane configured to support a fire suppression material and release the fire suppression material upon ballistic impact, the inner membrane being connected to the outer membrane to contain the fire suppression material in the at least one cell; and fire suppression material contained within the at least one cell, the fire suppression material being releasable from the at least one cell upon rupture of the at least one cell.

6. A method for packaging fire suppression material, the method comprising:

providing an outer membrane configured to support and release a fire suppression material;

providing an inner membrane configured to support and release a fire suppression material;

linking the outer membrane with the inner membrane, wherein linking the outer membrane and the inner membrane includes forming at least one cell;

disposing the fire suppression material within the at least one cell; and attaching the at least one cell to a support panel arranged to support a fuel tank, wherein the support panel includes a honeycomb panel.

7. A method for packaging fire suppression material, the method comprising:

providing an outer membrane configured to support and release a fire suppression material;

providing an inner membrane configured to support and release a fire suppression material;

linking the outer membrane with the inner membrane, wherein linking the outer membrane and the inner membrane includes forming at least one cell;

disposing the fire suppression material within the at least one cell; and attaching the at least one cell to a support panel arranged to support a fuel tank, wherein attaching the at least one cell includes using double-sided tape.

8. The method of claim 7, wherein:

the double-sided tape is foam double-sided tape.

* * * * *